May 1, 1962
J. M. EASTERLING
3,031,709
WINDSHIELD WIPER BLADE
Filed April 24, 1956
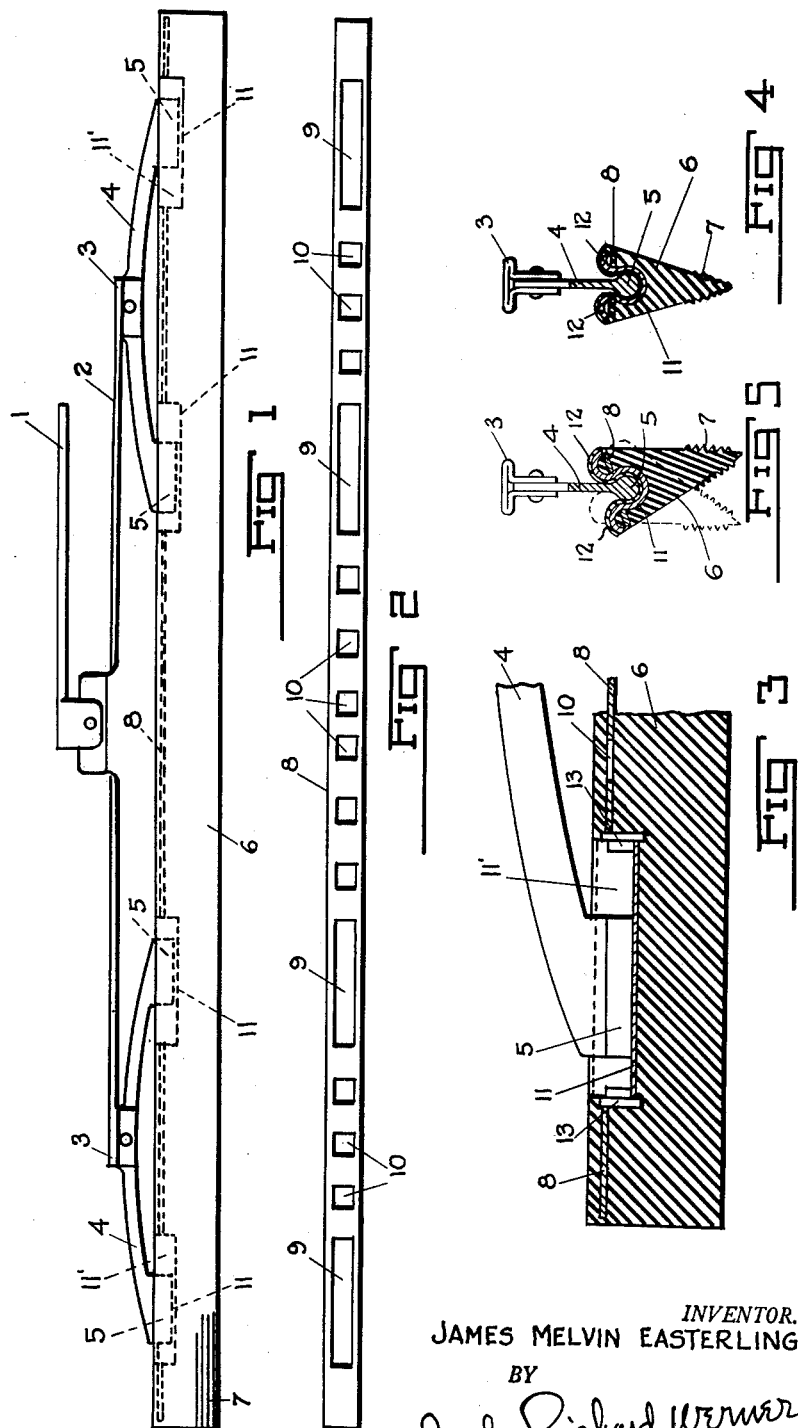
INVENTOR.
JAMES MELVIN EASTERLING
BY
Charles Richard Werner
ATTORNEY

United States Patent Office 3,031,709
Patented May 1, 1962

3,031,709
WINDSHIELD WIPER BLADE
James Melvin Easterling, Chicago, Ill., assignor to General Motors Corporation, Detroit, Mich., a corporation of Delaware
Filed Apr. 24, 1956, Ser. No. 580,207
7 Claims. (Cl. 15—250.42)

This invention relates in general to windshield wipers and in particular to an improvement in the blade and mounting therefore.

The primary object of my invention is to provide a windshield wiper blade having internal connections between the pressure applying superstructure and the squeegee unit wherein contact between the metal parts of the superstructure and the glass surface to be wiped will be prevented under all conditions.

The second object of my invention is to provide a windshield wiper blade with a concealed reinforcing resilient member completely encased in the rubber or similar material from which the blade is formed.

The third object of my invention is to provide a connection between the windshield wiper blade and the pressure applying superstructure which will not be rendered inoperative by the formation of ice.

And a fourth object of the invention is to provide a rocking connection between the blade and the pressure applying superstructure whereby the blade can rock to change its angle with the windshield at the end of each stroke, and thereby give a much better wiping action.

Other objects and advantages as well as the construction and operation of my invention will be apparent by reference to the following description in connection with the accompanying drawing in which:

FIG. 1 is a side elevational view of a blade assembly with a portion of the windshield wiper arm.

FIG. 2 is a view of the resilient insert used in my windshield wiper blade.

FIG. 3 is an enlarged detailed, fragmentary sectional view through the blade with one of the pivot pins shown in its socket.

FIG. 4 is a cross sectional view through the blade and socket.

FIGURE 5 is a sectional view similar to FIGURE 4 depicting one of the extreme rocking or tilting positions of the blade in full lines and the other extreme rocking position in dotted lines.

Referring now to the drawing by numerals of reference, 1 designates a conventional windshield wiper arm, carrying bridge 2, the ends 3 of which may be formed in a T-section as shown in FIG. 4.

Arcuate links 4 are suitably pivoted to ends 3 of the bridge and carry pivot pins 5.

The bridge 2 may also be referred to hereinafter as a primary yoke member, while the links 4 may be considered secondary yoke members which comprise a pressure applying superstructure. The pivot pins 5 are also termed as connectors, or pivotal connectors.

The windshield wiper blade 6 may be substantially triangular in cross section, may be provided with serrations or ribs 7 and may be made of rubber, neoprene, or any other suitable material, either natural or synthetic. It is preferred that the material be of a nature which will retain its resiliency under extreme cold weather conditions.

In forming the blade 6, an elongated resilient member 8 which may be flat in cross section, is molded into the form blade substantially as shown. A plurality of elongated spaced apertures 9 may be provided in the resilient member 8 and if desired member 8 may be lightened and made even more flexible by providing a plurality of lightening apertures 10. The rubber blade 6 with its backing strip 8 constitutes a squeegee unit.

An insert 11, which may be made of spring steel or any suitable resilient metal, or of a suitable synthetic material in the plastics field, is provided at each aperture 9 of elongated resilient member 8 and may have ears or oppositely disposed portions 12, the body of the insert being arcuate in cross section with the ears 12 preferably curved as shown, for easy entry of pivot pin 5. The inserts 11 form pockets in the blade body.

The inserts 11 are forced into position in apertures 9 prior to molding of the blade 6 and suitable end plugs 13 are inserted in the ends of the inserts to prevent entry of the material from which the blade is formed during the molding process, said blade material completely surrounding the resilient member 8 as well as the ears 12 of inserts 11.

There is sufficient resiliency in the insert 11 to permit the pivot pin 5 to be forced into and out of said insert, the width of the aperture 9 permitting sufficient opening of the insert.

The blade will have considerable flexibility in a plane transverse to the windshield so that it will be effective on the new wraparound windshields and any similarly curved surface. Adequate rigidity of the blade in the plane of the windshield will be maintained by the flat member 8.

It will be noted that the recesses 11' formed by the inserts 11 are greater in length than the pivot pins 5 and thereby provide for longitudinal movement of the pivot pins as the blade 6 flexes on the curved surfaces of a windshield.

With the entire blade including the ears 12 of inserts 11 covered with rubber or the like and the connections between the blade and links concealed, the possibility of ice forming on the blade is reduced to a minimum. The rocking of the blade and its flexing action are also factors which minimize ice formation.

From the foregoing it will be apparent that I have devised a windshield wiper blade which will be entirely covered with rubber or the like, which will have a flat resilient member embedded in the blade to give rigidity in one direction and strength and the correct flexibility in another direction, with apertures in the blade and in the resilient flat member, the ends of the links bridged to the windshield wiper arm being rockably mounted in and removable from the apertures.

Obviously, changes in form, proportion and details of construction may be resorted to without departing from the spirit of my invention and I reserve all rights to such changes as come wtihin the scope of these specifications and the claims which follow.

What I claim as new and desire to secure by Letters Patent is:

1. A windshield wiper blade assembly including, a squeegee unit having a completely nonmetallic exterior surface, and a pressure applying superstructure including a primary yoke and plural secondary yokes, said squeegee unit having a plurality of longitudinally spaced sockets therein, said secondary yokes having pivot pins at their free ends, said pivot pins being received in said sockets so as to permit tilting movement of said squeegee unit relative to said superstructure and being engageable with said squeegee unit to limit said tilting movement in both directions, said sockets being of greater longitudinal extent than said pivot pins to permit relative longitudinal movement between said squeegee unit and said superstructure.

2. A windshield wiper blade assembly blade assembly including, an elongate freely flexible blade body having a wiping edge, a flexible backing imbedded in the blade body having a plurality of longitudinally spaced slots, and a pressure applying superstructure comprising a plurality of relatively movable members having connectors at their free ends, said blade body having a plurality of spaced pockets aligned with the slots in the backing strip, said connectors being received by the slots in the backing and disposed within the pockets so as to interconnect the blade body and the backing strip with the superstructure and permit tilting movement therebetween, said connectors cooperating with said backing strip to limit tilting movement of the blade body and the backing strip relative to the superstructure.

3. A windshield wiper blade assembly including, an elongate freely flexible rubber body having a wiping edge, a flexible backing imbedded in the rubber body having a plurality of longitudinally spaced slots, said rubber body having a plurality of spaced pockets connecting with the slots in the backing, an insert disposed in each pocket, a pressure applying superstructure including a plurality of relatively movable members having pivotal connectors at their free ends, said pivotal connectors being adapted for reception in the inserts and cooperating with said inserts to limit relative tilting movement between the blade body and the backing strip and said superstructure.

4. A windshield wiper blade assembly including, a freely flexible elongate blade, a flexible backing strip arranged to support said blade, said backing strip having a plurality of longitudinally spaced slots therein, and a pressure applying superstructure comprising a plurality of relatively movable members having pivot pins at their free ends, a plurality of inserts equal in number to the number of said pivot pins and disposed in the slots of the backing strip, said pivot pins being received by said inserts so as to connect the backing strip and the superstructure, said members and said pivot pins cooperating with said inserts to limit tilting movement of the blade and the backing strip relative to said superstructure about the longitudinal axis of the blade.

5. The blade assembly set forth in claim 4 wherein said inserts are of greater longitudinal extent than said pivot pins so as to permit limited longitudinal movement between the superstructure and the backing strip.

6. The blade assembly set forth in claim 4 wherein said inserts partially embrace said pivot pins.

7. The blade assembly set forth in claim 4 wherein said inserts have open ends, and wherein the end of each insert is closed by a plug.

References Cited in the file of this patent

UNITED STATES PATENTS

| | | |
|---|---|---|
| 1,017,661 | Foster | Feb. 20, 1912 |
| 2,012,313 | Lark et al. | Aug. 27, 1935 |
| 2,672,641 | Scinta et al. | Mar. 23, 1954 |
| 2,701,382 | Oishei | Feb. 8, 1955 |
| 2,727,270 | Bosso | Dec. 20, 1955 |
| 2,727,271 | Oishei | Dec. 20, 1955 |
| 2,728,100 | Oishei | Dec. 27, 1955 |

FOREIGN PATENTS

| | | |
|---|---|---|
| 666,474 | Great Britain | Feb. 13, 1952 |